United States Patent
Nagano et al.

(10) Patent No.: US 6,551,954 B1
(45) Date of Patent: Apr. 22, 2003

(54) WC-BASE COMPOSITE CERAMIC SINTERED COMPACT

(75) Inventors: Mitsuyoshi Nagano, Fukuoka (JP); Shigeya Sakaguchi, Fukuoka (JP); Norimitsu Mukae, Fukuoka (JP); Kouki Minamoto, Fukuoka (JP); Toyoshige Sasaki, Fukuoka (JP)

(73) Assignee: Nippon Tungsten Co., Ltd., Fukuoka (JP)

( * ) Notice: Subject to any disclaimer, the term of this patent is extended or adjusted under 35 U.S.C. 154(b) by 83 days.

(21) Appl. No.: 09/869,241

(22) PCT Filed: Oct. 26, 2000

(86) PCT No.: PCT/JP00/07477

§ 371 (c)(1),
(2), (4) Date: Jul. 18, 2001

(87) PCT Pub. No.: WO01/30722

PCT Pub. Date: May 3, 2001

(30) Foreign Application Priority Data

Oct. 27, 1999 (JP) .............................. 11-306049

(51) Int. Cl.$^7$ ........................ C04B 35/56; C04B 35/488

(52) U.S. Cl. ........................ 501/87; 501/103; 501/104; 407/119; 264/674

(58) Field of Search .......................... 501/87, 103, 104; 407/119; 264/674

(56) References Cited

U.S. PATENT DOCUMENTS 4,828,584 A * 5/1989 Cutler ........................ 51/307

FOREIGN PATENT DOCUMENTS

| JP | 62-288166 | * | 12/1987 |
| JP | 3-50154 | * | 3/1991 |
| JP | 5-279121 | * | 10/1993 |

* cited by examiner

*Primary Examiner*—Karl Group
(74) *Attorney, Agent, or Firm*—Jordan and Hamburg LLP

(57) ABSTRACT

A WC-based composite ceramics sintered body consisting of 40 volume % to 90 volume % of WC including solid-solved oxygen represented by a chemical formula of $WC_xO_y$ (where $0.005<y/x+y<0.05$), with the remainder being partially stabilized $ZrO_2$ and inevitable impurities, wherein partially stabilized $ZrO_2$ includes one or more of stabilizers selected from the group consisting of $Y_2O_3$, $CeO_2$ and MgO. A prepared powder of raw material is held in an atmosphere containing oxygen in a temperature range of 200° C. to 600° C. for 0.1 hour to 3 hours to provide WC grains including solid-solved oxygen represented by a chemical formula of $WC_xO_y$ (where $0.005<y/x+y<0.05$). Partially stabilized $Zro_2$ including one or more of stabilizers selected from the group consisting of $Y_2O_3$, $CeO_2$ and MgO is used as a phase for filling up the grain boundary of the WC grains. A ceramic sintered body capable of sufficiently fulfilling various properties, such as of Young's modulus, hardness, heat conductivity and electrical workability, which are required as materials for sliding parts, edged tools and dies can be obtained.

5 Claims, No Drawings

WC-BASE COMPOSITE CERAMIC SINTERED COMPACT

TECHNICAL FIELD

The present invention relates to a WC-based composite ceramics sintered body used in sliding wear parts of a machine, edged tools for cutting polymer materials such as polyethylene or metals such as aluminum alloys, press dies for bending and cutting metals or polymer materials, or the like which are required to have a high wear resistance.

BACKGROUND ART

Heretofore, most wear-resistant members, such as sliding wear parts of a machine, cutting blades or dies, have been formed by using ferrous metals represented by die steel. However, $ZrO_2$-based or $Si_3N_4$-based ceramics has been recently used as a substitute for such ferrous metals having an insufficient wear resistance.

Particularly in press working required to provide an accurate size of a finished product, since a press die tends to incur seizing with a workpiece and earlier wear-out, it is necessary to form the press die with a material having a long life and excellent wear resistance.

As a ceramics die material having a higher hardness and superior seizing resistance in comparison with metals, Japanese Patent Publication No. Hei 01-024747 (Japanese Patent Laid-Open Publication No. Sho 58-120571), Japanese Patent Laid-Open Publication No. Hei. 03-051667 and Japanese Patent Laid-Open Publication No. Hei 09-221352 disclose die materials in which $ZrO_2$ ceramics is strengthened by dispersing carbide or nitride grains of transition metals therein.

Required properties of the die material in case of applying ceramics to sliding wear parts, cutting blades or dies include four parameters of Young's modulus, hardness, heat conductivity and electrical workability.

As to Young's modulus, conventional ferrous metals represented by die steel or conventional ceramics-based materials including zirconia as a primary component for providing high strength and toughness have a low Young's modulus of 2.5 GPa or less. Thus, each conventional material is insufficient in stiffness during its high-speed sliding motion with respect to an opposite member. This causes an elastic deformation of the material and excessive friction between the material and the opposite member, resulting in an abnormal wear of the material. Specifically, the ferrous materials cause an abnormal wear, while in $ZrO_2$-based materials, the resulting frictional heat promotes crystal transformation and thereby an undesirable wear arises from fall-off of grains. This wear has an influence on usable period or life of parts. In particular, such wear would be a fatal factor in a field having a requirement of accurate motion.

As to hardness, the advantage of ceramics compared to conventional metal-based materials is to provide an improved wear resistance based on high hardness. However, a ceramics-based die material including zirconia as a primary component is insufficient in hardness and thereby low wear resistance or short life is undesirable exhibited.

WC includes free carbon. Thus, during a sintering process in an inert atmosphere, the free carbon remains in a sintered body, and undesirable fracture can originate in the remaining free carbon, resulting in lowered strength of the sintered body. In a $ZrO_2$-WC composite body, $ZrO_2$ and WC have different thermal expansion coefficients and are oxide and carbide, respectively, which are not solid-soluble each other. Thus, at a stage in which the composite body has been cooled from a high temperature in a sintered state down to a room temperature, cracks can arise from a difference in thermal expansion, and the composite body tends to fracture due to lowered mechanical properties, particularly in bending strength.

As to heat conductivity, when heat conductivity is low, heat generated by friction during high-speed motion can be accumulated in the material, and this accumulated heat causes phase transition in zirconia as the primary component, resulting in fracture due to the transformation.

As to electrical workability, in parallel with advancing electrical machining technologies, such as a wire-cut electric discharge machining, as well as mechanical machining technologies, many parts are recently produced by using such technologies, and it is often the case that an electrically machined surface of such parts is used as it is. However, even in the zirconia-based ceramics material enhancing hardness and conductivity, its electrically machined surface has a degraded surface roughness due to insufficient fineness and uniformity of the internal structure of the die material. As a result, the electrically machined surface could not be used as it is.

It is an object of the present invention to provide a ceramic sintered body capable of sufficiently fulfilling various properties, such as Young's modulus, hardness, heat conductivity and electrical workability, which are required as materials for sliding parts, edged tools and dies.

DISCLOSURE OF INVENTION

The present invention provides a WC-based composite ceramics sintered body consisting of 40 volume % to 90 volume % of WC including solid-solved oxygen represented by a chemical formula of $WC_xO_y$ (where $0.005 < y/x+y < 0.05$), with the remainder being partially stabilized $ZrO_2$ and inevitable impurities, wherein the partially stabilized $ZrO_2$ includes one or more of stabilizers selected from the group consisting of $Y_2O_3$, $CeO_2$ and MgO.

The WC-based composite ceramics sintered body can be obtained by the following process. A pre-sintered prepared powder of raw material is held in an atmosphere containing oxygen in a temperature range of 200° C. to 600° C. for 0.1 hour to 3 hours to provide WC grains including solid-solved oxygen represented by a chemical formula of $WC_xO_y$ (where $0.005 < y/x+y < 0.05$). As a phase for filling up the grain boundary of the WC grains, partially stabilized $ZrO_2$ is used which includes one or more of stabilizers selected from the group consisting of $Y_2O_3$, $CeO_2$ and MgO. Then, the obtained WC is subjected to a normal sintering process or hot press sintering process in an inert gas in a temperature range of 2023 K to 2123 K to obtain the WC-based composite ceramics sintered body. Simultaneously, through the oxidizing heat treatment, free carbon in the WC grains can be removed to provide an improved grain fall-off resistance, and an enhanced hardness, toughness and strength of the composite material. Further, the electrical machining operation can provide an improved electrical workability and heat conductivity with lower electric resistance.

BEST MODE FOR CARRYING OUT THE INVENTION

Modes of embodiments according to the present invention will now be described in conjunction with examples.

A compound of raw material shown in Table 1 was prepared by providing a WC powder having an average grain size of 0.5 μm, and a predetermined amount of $ZrO_2$ having an average grain size of 0.5 μm and partially stabilized by 3 mol % of $Y_2O_3$, as primary components, adding the predetermined amount of $ZrO_2$ to the WC powder, and mixing the WC powder and the predetermined amount of $ZrO_2$ for 20 hours within a nylon pot containing $ZrO_2$ balls each comprising a sintered body having a purity of 99.5% in a methanol solvent. The resulting slurry was taken out, and a granular powder was then prepared by adding an alcoholic binder to the slurry, and drying the slurry with the binder by a closed cycle type spray dryer in a nitrogen atmosphere.

Samples for a bending test of 4×5×45 and samples for measuring heat conductivity of φ20×3 t mm were made from the prepared granular powder through die press working, and were degreased by holding in a vacuum atmosphere at 500° C. for 1 hour. After degreasing, the resulting press bodies were subjected to a heat treatment in an ambient atmosphere at 400° C. for 1 hour to introduce oxygen into the WC grains. Then, the bodies were subjected to a normal sintering process in an argon gas in a temperature range of 2030 K to 2123 K. A part of the obtained samples were subjected to an HIP treatment using a nitrogen gas in a temperature range of 1923 K to 2023 K. Otherwise, the oxidizing heat treatment may be carried out to the powder of raw material or the prepared powder after granulating and drying to obtain the same effect.

The degreased press bodies of 50×50×5 mm were put in a carbon dice and subjected to the hot press sintering process. Each sample made through two kinds of sintering processes was machined, and each heat conductivity of their mechanical properties was measured.

The obtained samples were appropriately cut to research their solid-state properties and measure their thermal properties such as heat conductivity.

As to the oxygen amount in WC, the ratio of C and O was determined by measuring each diffractive intensity of WC and $WO_3$ at a low angle side in X-ray diffractions of the obtained sintered bodies.

The above measurement results are shown in Table 1. The following effects can be proved from each of the results.

1. Relationship between Addition Amount of $ZrO_2$ and Sintering Property

WC grains have excellent properties of high hardness, Young's modulus, conductivity and melting point. On the other hand, due to its poor sintering property, a single substance of WC is hardly to be adequately sintered. Thus, as in hard metals, a binder phase is formed by adding a metal such as Co or Ni to finalize a sintered body structure. However, the properties of metals serving as the binder phase are significantly exhibited in evaluations of wear resistance, high temperature property which are influenced by hardness or the like. According to the present invention, using $ZrO_2$, which has high strength and toughness among ceramics, as a substitute for the binder phase based on metals, such as Co or Ni, allows the WC grains to be sintered in approximate theoretical density.

The content of WC depends on the sintering property varied by the addition amount of $ZrO_2$, and it has been identified that a dense sintered body exhibiting high strength could be obtained by adding $ZrO_2$ of 20 volume %.

While the $ZrO_2$ component is preferably provided as a stabilized $ZrO_2$ obtained by adding $Y_2O_3$ of 2 to 4 mol %, a stabilized $ZrO_2$ obtained by adding MgO or $CeO_2$ may achieve the similar effects. However, a sufficient sintering property cannot be assured by 20 volume % or less of $Zro_2$.

In this case, a sintered body having many pores will be provided with degraded strength and hardness. On the other hand, in 60 volume % or more of $ZrO_2$, it has been identified that the properties of $ZrO_2$ was significantly exhibited, and caused deteriorated hardness and wear resistance, and the grain fall-off, particular to $ZrO_2$, due to transformation by the frictional heat, resulting in inferior sliding wear resistance.

2. Effect of Removing Free Carbon

WC includes free carbon. Thus, during a sintering process in an atmosphere containing an inert gas such as an argon gas, the free carbon is apt to remain in the form of a lump of carbon in a sintered body, and some fracture can originate in the remaining free carbon, resulting in lowered strength of the sintered body. According to the present invention, the free carbon can be removed by subjecting WC in the stage of green compact to an oxidizing heat treatment to sublimate the free carbon as a hydrocarbon compound, which enables a sintered body to assure high strength. In Table 1, the inventive examples No. 1 to 9 show a minimum strength decreasing rate of 15% or less. While the examples No. 16 to 19 having the same composition as that of the inventive examples but the heat treatment conditions out of the inventive range show few difference in most properties, their minimum strength is lower and a decreasing rate of 25% or more is caused by a remaining free carbon.

3. Solid-Solution Amount to WC

WC is gradually oxidized in the temperature range of less than 600° C. and the oxidization exponentially accelerates in the temperature range of 600° C. or more. In parallel with the progression of the oxidization, the solid solution amount of oxygen is increased. When the value of y/x+y in $WC_xO_y$ is increased to 0.05 or more, an oxide film is formed on the surface of the WC. This causes lowered strength. Further, since the oxide film has an insulative property, the electrical conductivity is deteriorated. Thus, it is preferable that the solid-solution amount of oxygen to WC is defined by $WC_xO_y$ (where 0.005<y/x+y<0.05). As is apparent in the comparison between the inventive examples No. 1 to 9 and the examples No. 16 to 19 having the same composition as that of the inventive examples but the solid-solution amount of oxygen out of the inventive range in Table 1, there are differences in decreasing rate of strength, heat conductivity and electric resistance between them, and the examples No. 16 to 19 are inferior in cut surface roughness and sliding wear amount in dynamic properties.

4. Effect of mixing $ZrO_2$ to $WC_xO_y$

The reasons for excellent properties of a composite material of WC and $ZrO_2$ are as follows.
(1) Generation of Residual Stress in Grain Boundary between WC and $ZrO_2$ There is a large difference in thermal expansion coefficient between WC and $ZrO_2$, specifically thermal expansion coefficients of WC and $ZrO_2$ are 4×10–6 and 10×10–6, respectively. Thus, when the sintered body is cooled from a sintering temperature down to a room temperature, a certain compression stress is acted to WC and a certain tensile stress is acted to $ZrO_2$. This provides an effect of enhancing strength and toughness of the sintered body. By virtue of combination of matrix and dispersed grains, the difference in thermal expansion is maximized in the combination of the present invention. However, this also leads to cracks. Thus, it is advantageous to effectively restrain such cracks by arranging the solid-solution amount of oxygen to WC in $WC_xO_y$ (where $0.005<y/x+y<0.05$) to provide stress relaxation in grain boundary.

(2) Superplasticity Phenomenon during Sintering of $ZrO_2$

Differently from hard metals including Co or Ni, ceramics is densified in solid-phase sintering, not in liquid-phase sintering, during a sintering process. For example, in solid-phase sintering between $Al_2O_3$ and WC, $Al_2O_3$ acts as a rate-limiting factor of sintering. Thus, any plastic flow is caused during crystal structure is densified, and thereby pores are apt to remain. However, in the combination of $WC_xO_y$ and $ZrO_2$ according to the present invention, a superplasticity phenomenon appears in the sintering temperature of $Zro_2$, and a structure in which $ZrO_2$ gets into a space between crystals is formed to provide enhanced density. In this case, the density is more enhanced by using $WC_xO_y$ which includes a few amount of solid-solved oxygen, as compared with using only WC. Thus, an adequate sintering can be achieved by less amount of $ZrO_2$ than that in combination of only WC and $Zro_2$.

5. Relationship between WC Amount and Thermal Properties

As described above, in the combination of $WC_xO_y$ and $ZrO_2$ grains of the present invention, $WC_xO_y$ and $ZrO_2$ grains are dispersed in an individually independent form without any mutual reaction. Further, since $WC_xO_y$ is matrix and $ZrO_2$ functions to restrain grain growth as with the function of a grain boundary binding phase. This allows WC and $ZrO_2$ to be uniformly dispersed respectively. In addition, by virtue of generation of residual stress, as compared to conventional ceramics, enhanced values of strength, toughness and hardness are exhibited. More excellent thermal and electrical properties than ever are also provided. As shown in Table 1, when $Al_2O_3$ having lower thermal expansion coefficient than that of $ZrO_2$ is mixed to $WC_xO_y$ each improvement in the properties is small. This can verify that the composite material of $WC_xO_y$ and $ZrO_2$ is more effective.

In particular, the composite material has a Young's modulus of 300 MPa or more, which is 1.5 times or more of that of $ZrO_2$-based ceramics or metals, and can assure the same stiffness as that of $Si_3N_4$. For example, if this composite material is applied to high-speed motion mechanisms such as bearing and sleeve, or high-speed press machines, lowered distortion and deformation, restrained frictional heat, and reduced sliding wear can be achieved.

As to thermal properties, ceramics including a large amount of $ZrO_2$ has low heat conductivity. In contrast, since the composite material according to the present invention includes WC having high heat conductivity as a primary component, a sufficient heat conductivity being ten times of that of a simple substance of $ZrO_2$ is obtained to provide an-improved thermal shock resistance against rapid heating and cooling.

6. Relationship between $WC_xO_y$ Amount and Electrical Properties $WC_xO_y$ itself has a high conductivity. Thus, larger $WC_xO_y$ amount, less electric resistance value. As to heat conductivity, an electrical machining such as a wire-cut electric discharge machining can be applied to a composite material including 30 volume % or more of $WC_xO_y$. In this case, it has been proved that surface roughness of the electrically machined surface was influenced by the conductivity of the composite material and the dispersed degree of conductive grains. As shown in Table 1, it has been identified that 50 volume % or more of $WC_xO_y$ could provide an improved surface roughness of the electrically machined surface.

7. Affect of Dispersion state of $WC_xO_y$ and $ZrO_2$

In the material of the present invention, mechanical, thermal and electrical properties are influenced a great deal by the dispersion state of each components of the composite material. Agglomerates of $WC_xO_y$ or $ZrO_2$ are left as a defect originating fracture. As to electrical properties, agglomerates of $ZrO_2$ cannot be electrically machined and is thereby left as a crude portion. As to sliding wear, the agglomerates of $WC_xO_y$ or $ZrO_2$ cause abnormal wear. Thus, each agglomerate of $WC_xO_y$ and $ZrO_2$ is required to limit to 10 $\mu$m or less when converting into diameter of the same area, and to 3 or less per $mm^2$ in its number.

8. Relationship between WC Amount and Sliding Wear Property

In the wear test, each wear value was measured by inserting each sample of the inventive materials and comparative materials each having an outer diameter of 40 mm, inner diameter of 30 mm and a length of 50 mm, into an inside of a hard metal cylinder having an outer diameter of 50 mm, inner diameter of 40 mm and a length of 50 mm, and rotating the cylinder at 500 rpm to make the cylinder slide to each sample for 3 minutes. The result is shown in Table 1. The wear amount tends to decrease as the addition amount of $WC_xO_y$ is increased. The reason for this tendency can be presumed as follows. High Young's modulus provides low distortion and deformation. Then, abnormal wear and heat due to uneven contact caused by the deformation or the like are reduced and thereby wear is restrained. The Young's modulus is required to be 300GPa or more The examples out of the present invention including 40 volume % or less of $WC_xO_y$ and the comparative examples including a simple substance of $ZrO_2$ have a Young's modulus of 300 MPa or less, and thereby provide inferior wear resistance. Further, since $WC_xO_y$ is carbide having an excellent solid lubricant property, sliding wear tends to decrease as the $WC_xO_y$ amount is increased. As shown in Table 1, such property is significantly exhibited by 50 volume % or more of $WC_xO_y$ The WC-based composite ceramics sintered body can provide materials for long-life sliding parts, edged tools or dies, excellent in mechanical and thermal properties, electrical workability and sliding properties.

INDUSTRIAL APPLICATION

The present invention may be applied to sliding parts of a machine, edged tools for cutting polymer materials such as polyethylene or metals such as aluminum allies, press dies for bending and cutting metals or polymer materials, or the like which are required to have a high wear resistance.

TABLE 1

Comparison on Properties of Inventive Examples

| No. | WC | ZrO2 | stabilizer | theoretical density | sintered density | porosity % | solid-solution amount | hardness HRA | Young's modulus Mpa | bending strength Mpa average | bending strength Mpa minimum | decreasing rate % | heat conductivity W/m·h | electric resistance mm Ω/cm | thermal shock | surface roughness of wire cut surface | sliding wear amount |
|---|---|---|---|---|---|---|---|---|---|---|---|---|---|---|---|---|---|
| Inventive examples | | | | | | | | | | | | | | | | | |
| 1 | 40 | 60 | Y2O3 | 9.850 | 9.79 | 99.39% | 0.007 | 92.3 | 305 | 1820 | 1570 | 13.7% | 28 | 1.2 | ◎ | ◎ | ◎ |
| 2 | 50 | 50 | Y2O3 | 10.93 | 10.9 | 99.73% | 0.010 | 92.5 | 330.0 | 1900 | 1660 | 12.6% | 38 | 0.8 | ◎ | ◎ | ◎ |
| 3 | 50 | 50 | MgO | 10.93 | 10.88 | 99.54% | 0.011 | 92.3 | 325.0 | 1500 | 1250 | 16.7% | 33 | 0.7 | ◎ | ◎ | ◎ |
| 4 | 50 | 50 | CaO | 10.93 | 10.89 | 99.63% | 0.009 | 92.4 | 321.0 | 1450 | 1300 | 10.3% | 34 | 0.9 | ◎ | ◎ | ◎ |
| 5 | 55 | 45 | Y2O3 | 11.42 | 11.38 | 99.65% | 0.012 | 92.7 | 345.0 | 1850 | 1690 | 8.6% | 42 | 0.4 | ◎ | ◎ | ◎ |
| 6 | 60 | 40 | Y2O3 | 11.91 | 11.85 | 99.50% | 0.014 | 93.0 | 352.0 | 1800 | 1570 | 12.8% | 45 | 0.2 | ◎ | ◎ | ◎ |
| 7 | 65 | 35 | Y2O3 | 12.39 | 12.33 | 99.52% | 0.015 | 93.3 | 373.0 | 1780 | 1660 | 6.7% | 50 | 0.13 | ◎ | ◎ | ◎ |
| 8 | 70 | 30 | Y2O3 | 12.88 | 12.8 | 99.38% | 0.018 | 93.4 | 390.0 | 1800 | 1590 | 11.7% | 55 | 0.11 | ◎ | ◎ | ◎ |
| 9 | 80 | 20 | Y2O3 | 13.854 | 13.78 | 99.47% | 0.019 | 93.8 | 400.0 | 1780 | 1700 | 4.5% | 61 | 0.08 | ◎ | ◎ | ◎ |
| examples out of Invention | | | | | | | | | | | | | | | | | |
| 10 | 0 | 100 | Y2O3 | 6.07 | 6.06 | 99.84% | 0 | 90.5 | 188.0 | 1650 | 1550 | 6.1% | 0.5 | 1.00E+14 | ○ | inability of cutting | X |
| 11 | 10 | 90 | Y2O3 | 7.04 | 7 | 99.43% | 0.002 | 90.7 | 215.0 | 1700 | 1390 | 18.2% | 3 | 1E+14 | ○ | inability of cutting | X |
| 12 | 20 | 80 | Y2O3 | 8.02 | 7.95 | 99.13% | 0.003 | 91.2 | 228.0 | 1870 | 1500 | 19.8% | 6 | 1E+11 | ○ | inability of cutting | ○ |
| 13 | 30 | 70 | Y2O3 | 8.99 | 8.91 | 99.11% | 0.004 | 91.3 | 240.0 | 1750 | 1460 | 16.6% | 11 | 3 | ○ | ◎ | ○ |
| 14 | 90 | 10 | Y2O3 | 14.83 | 14.1 | 95.08% | 0.025 | 91.0 | 382.0 | 720 | 590 | 18.1% | 38 | 0.05 | ○ | ◎ | X |
| 15 | 100 | 0 | Y2O3 | 15.8 | 14.8 | 93.67% | 0.050 | 90.0 | 379.0 | 618 | 450 | 27.2% | 41 | 0.05 | ◎ | ◎ | ◎ |
| 16 | 40 | 60 | Y2O3 | 9.85 | 9.76 | 99.09% | 0.001 | 92.1 | 310.0 | 1790 | 1210 | 32.4% | 29 | 1.1 | ◎ | ◎ | ◎ |
| 17 | 50 | 50 | Y2O3 | 10.93 | 10.86 | 99.36% | 0.001 | 92.5 | 331.0 | 1880 | 1330 | 29.3% | 39 | 0.16 | ◎ | ◎ | ◎ |
| 18 | 60 | 40 | Y2O3 | 11.91 | 11.82 | 99.24% | 0.001 | 93.1 | 355.0 | 1710 | 1290 | 24.6% | 43 | 0.11 | ◎ | ◎ | ○ |
| 19 | 70 | 30 | Y2O3 | 12.88 | 12.71 | 98.68% | 0.001 | 93.3 | 385.0 | 1740 | 1310 | 24.7% | 54 | 0.09 | ◎ | ○ | ○ |
| 20 | 40 | 60 | Y2O3 | 9.85 | 9.87 | 100.20% | 0.86 | 92.0 | 305.0 | 1720 | 980 | 43.0% | 19 | 9.8 | ◎ | ○ | ○ |
| 21 | 50 | 50 | Y2O3 | 10.93 | 11.01 | 100.73% | 0.98 | 92.3 | 323.0 | 1690 | 970 | 42.6% | 27 | 2.4 | ◎ | ○ | ○ |
| 22 | 60 | 40 | Y2O3 | 11.91 | 12.05 | 101.18% | 1.05 | 92.9 | 345.0 | 1700 | 1020 | 40.0% | 31 | 1.9 | ◎ | ○ | ○ |
| 23 | 70 | 30 | Y2O3 | 12.88 | 12.98 | 100.78% | 1.2 | 93.2 | 387.0 | 1680 | 890 | 47.0% | 40 | 0.7 | ◎ | ○ | ○ |

TABLE 1-continued

Comparison on Properties of Inventive Examples

| No. | WC | ZrO2 stabilizer | theoretical density | sintered density | porosity % | solid-solution amount | hardness HRA | Young's modulus Mpa | bending strength Mpa average | minimum | decreasing rate % | heat conductivity W/m · h | electric resistance mm Ω/cm | thermal shock | surface roughness of wire cut surface | sliding wear amount |
|---|---|---|---|---|---|---|---|---|---|---|---|---|---|---|---|---|
| comparative examples | | | | | | | | | | | | | | | | |
| SKD60 | | | 7.8 | | | | 45.0 | 201.0 | 450 | | | 170 | 0.02 | X | | X |
| hard metal | | | 15.3 | 15.12 | 98.82% | | 89.5 | 450.0 | 2600 | | | 115 | 0.3 | X | X | X |
| Si3N4 | | 3 | 3.3 | 3.27 | 99.09% | | 93.5 | 320.0 | 1200 | | | 31 | 1E + 14 | ○ | X | ⊙ |
| Al2O3—TiC | | 5 | 4.24 | 4.23 | 99.76% | | 94.0 | 390.0 | 845 | | | 29 | 4 | ○ | Δ | Δ |
| Al2O3 | | 7 | 3.99 | 3.98 | 99.75% | | 93.5 | 370.0 | 735 | | | 25.4 | 1E + 14 | ○ | inability of cutting | X |
| Al2O3 | 50 | | 8.8 | 8.79 | 99.89% | | 93.5 | 420.0 | 900 | | | 35.4 | 0.1 | ⊙ | inability of cutting | X | thermal shock resistance measured by water drop method
⊙ temperature difference 300° C. or more
○ temperature difference 250–300° C.
X temperature difference 250° C. or less
surface roughness of wire cut surface
⊙ surface roughness Ra 1.5 μm or less
○ surface roughness Ra 1.5–2.0 μm
X surface roughness Ra 2.0 μm or more
sliding wear amount
⊙ wear amount 50 μm or less
○ wear amount 50–100 μm or less
X wear amount 100 μm or more

What is claimed is:

1. A WC-based composite ceramics sintered body consisting of 40 volume % to 90 volume % of WC including solid-solved oxygen represented by a chemical formula of $WC_xO_y$ (where $0.005<y/x+y<0.05$), with the remainder being partially stabilized $ZrO_2$ and inevitable impurities, said partially stabilized $ZrO_2$ including one or more of stabilizers selected from the group consisting of $Y_2O_3$, $CeO_2$ and MgO.

2. A WC-based composite ceramics sintered body as defined in claim 1, wherein agglomerates of either one of $WC_xO_y$ (where $0.005<y/x+y<0.05$) and $ZrO_2$ in said sintered body respectively have a diameter of 3 μm to 10 μm when said diameter is converted into a diameter of a sphere having the same volume as that of each agglomerate, and the number of said agglomerates are 3 or less per $mm^3$.

3. A WC-based composite ceramics sintered body as defined in claim 1, which has a Young's modulus of 300 GPa or more.

4. A WC-based composite ceramics sintered body as defined in claim 1, which has a heat conductivity of 20 W/m·K or more.

5. A manufacturing method of a WC-based composite ceramics sintered body in which a mixed powder consisting of 40 volume % to 90 volume % of WC, with the remainder being partially stabilized $ZrO_2$ including one or more of stabilizers selected from the group consisting of $Y_2O_3$, $CeO_2$ and MgO is held in an atmosphere containing oxygen in a temperature range of 200° C. to 600° C. for 0.1 hour to 3 hours to provide WC including solid-solved oxygen represented by a chemical formula of $WC_xO_y$ (where $0.005<y/x+y<0.05$).

* * * * *